United States Patent Office 3,405,125
Patented Oct. 8, 1968

3,405,125
1-OXYGENATED ANDROSTANES
Klaus Irmscher, Darmstadt, and Karl-Heinz Bork, Darmstadt-Arheilgen, Germany, assignors to E. Merck A.G., Darmstadt, Germany
No Drawing. Continuation-in-part of application Ser. No. 328,121, Dec. 4, 1963. This application Apr. 18, 1966, Ser. No. 543,087
6 Claims. (Cl. 260—239.5)

ABSTRACT OF THE DISCLOSURE

Reductively splitting a 1α,2α-oxido-3-keto-steroid with an alkaline metal or an alkaline earth metal in either liquid ammonia, primary amine, or secondary amine, the ratio of the metal to the starting material being about 1:1 to 1:15, respectively; the resultant 1-oxygenated, 3-keto androstanes having a free or esterified 17-hydroxyl group being useful for their anabolic and/or androgenic activity.

---

This is a continuation-in-part of copending United States patent application Ser. No. 328,121, filed Dec. 4, 1963, now abandoned.

This invention relates to the preparation of 1α-hydroxy-3-keto steroids and the esters and ethers thereof.

An object of this invention, therefore, is to provide novel and unobvious 1α-hydroxy-3-keto steroids, particularly steroids of the androstane series, and their esters and ethers.

Another object is to provide a novel and unobvious process for the production of the novel steroids of this invention.

Still another object is to provide novel and unobvious pharmaceutical compositions based on the steroids of this invention.

Yet another object is to provide processes for effecting therapeutic activity, using the steroids of this invention.

Upon further study of the specification and claims, other objects and advantages of the present invention will become apparent.

To attain the objects of this invention, there are provided 1α-hydroxy-3-keto steroids as well as their esters and ethers of the formula:

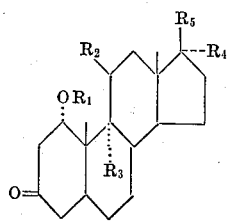

I wherein $R_1$ represents any of hydrogen; alkyl of not more than 6 carbon atoms; cycloalkyl of not more than 6 carbon atoms; and acyl, preferably alkanoyl, of not more than 18 carbon atoms;
$R_2$ represents H or OH;
$R_3$ represents H or F;
$R_4$ represents any of alkyl, alkenyl, and alkynyl, none of which contains more than 3 carbon atoms; and hydrogen; and
$R_5$ represents a free or esterified hydroxy group wherein the esterifying moiety contains up to 18 carbon atoms.

Two preferred groups of compounds are:
(1) androstane-1α,17β-diol-3-one, and the monoesters, diesters, and the 1-lower alkyl ethers thereof; and
(2) 17α-methyl-androstane-1α,17β-diol-3-one, and the monoesters, diesters, and 1-lower alkyl ethers thereof.

The preferred species are:

androstane-1α,17β-diol-3-one-17-acetate
androstane-1α,17β-diol-3-one-17-propionate
androstane-1α,17β-diol-3-one-17-cyclohexyl-propionate
androstane-1α,17β-diol-3-one-17-nicotinate
1-methyl-ether of androstane-1α,17β-diol-3-one-17-acetate
1-methyl-ether of androstane-1α,17β-diol-3-one-17-propionate
1-methyl-ether of androstane-1α,17β-diol-3-one-17-cyclohexyl-propionate
1-methyl-ether of androstane-1α,17β-diol-3-one-17-nicotinate
androstane-1α,17β-diol-3-one-1,17-diacetate
androstane-1α,17β-diol-3-one-1-acetate-17-propionate
androstane-1α,17β-diol-3-one-1-acetate-17-cyclohexyl-propionate
androstane-1α,17β-diol-3-one-1-acetate-17-nitcotinate
17α-methyl-androstane-1α,17β-diol-3-one
1-methyl-ether of 17α-methyl-androstane-1α,17β-diol-3-one
17α-methyl-androstane-1α,17β-diol-3-one-1-acetate.

These compounds are produced by reacting a 1α,2α-oxido-3-keto-steroid with an alkali metal or alkaline earth metal in either liquid ammonia or a primary or secondary amine.

According to this invention, the reaction can also be performed in the presence of an alcohol, preferably a lower aliphatic alcohol and/or another solvent inert under the reaction conditions. It is then also possible to esterify or etherify the resultant hydroxy-steroid in the conventional manner.

It is to be appreciated that during the conversion of a 1α,2α-oxido-3-keto-steroid, the 3-keto group remains intact under the reaction conditions of this invention. This is completely unexpected because it was made known by the reports in the J. Am. Chem. Soc., vol. 78, pp. 6302 et seq. (1956) and vol. 80, p. 6117 (1958), that under the reaction conditions of this invention, keto groups in the 3-position would be reduced to the corresponding secondary alcohol groups. Therefore, it would have been assumed by those skilled in the art that the process of this invention would produce not 1α-hydroxy-3-keto-steroids, but rather the corresponding 1α,3-dihydroxy-steroids.

Even though it was known that epoxides could be reduced to alcohols by alkali metals in liquid ammonia or amines, and that this method is also applicable to the steroid series (see J. Chem. Soc. [London], vol. 1957, p. 4604), no reaction of this kind has been described which can be performed in the presence of a keto group, because as is known, keto groups under the reaction conditions are reduced to the corresponding alcohols. It was also unexpected that the reaction would produce only the 1α-hydroxy steroid and not a mixture of 1- and 2-hydroxy steroids, and especially since the theoretically obtainable 2-hydroxy steroid and also the actually obtained 1-hydroxy steroid are both secondary alcohols.

The process of this invention can be performed in liquid ammonia or in a primary or secondary amine. Although generally all primary and secondary amines are suitable for this reaction, it is advantageous in this invention to use those amines which do not contain more than 10 carbon atoms and also not more than 2 amino groups. Use is preferably made of n- and isopropylamine, n-butyl-amine, isobutylamine, secondary butylamine, diethyl-amine, di-n-propylamine, diisopropylamine, aniline, mono-methyl-aniline, or cyclohexylamine. The amine is so chosen that it is a liquid under the reaction conditions employed. The reaction temperatures that are used preferably lie between −100° C. and +100° C.

As alkali or alkaline earth metals, use is preferably made of lithium, sodium, potassium, or calcium.

The molar ratio of the initial steroid to the alkali metal or alkaline earth metal lies generally between 1:1 and 1:15, whereas the ratio of the initial steroid to the ammonia is in no way critical.

It is sometimes beneficial to perform the reduction in the presence of an alcohol which functions to accelerate the reaction.

Preferably, a lower aliphatic alcohol, such as methanol or ethanol, is used for this purpose, the ratio of the alcohol to initial steroid being about 0.2:1 to 10:1, expressed as molar ratio. Here also the reaction is performed at temperatures within the above range. The solvents that are used, namely liquid ammonia or a primary or secondary amine, are also the same as those mentioned above. Instead of or in addition to the lower aliphatic alcohol, other inert solvents can also be used, such as ether, tetrahydrofuran, dioxane, or hydrocarbons, such as benzene, toluene, or petroleum ether. The inert solvent increases the solubility of the starting material in the reaction mixture and is generally added in a quantity sufficient to dissolve the initial steroid.

The solution containing the reaction products is worked up in the usual manner, as by reaction with water, a mineral acid, or ammonium chloride, with subsequent isolation by extraction, chromatography, and/or crystallization.

According to this invention it is also possible to esterify or etherify the hydroxyl groups of the hydroxysteroids obtained by the above-described reduction. For etherifying, use can be made of the usual reactive derivatives of those alcohols which form physiologically compatible ethers. Among such alcohols can be mentioned methanol, ethanol, propanol, isopropanol, n-butanol, isobutanol, teritary butanol, cyclopentanol, and cyclohexanol, this list, however, being not exhaustive.

Alcohol derivatives which can be advantageously used for etherifying are the iodide, bromide, chloride, methylsulfonate, p-toluenesulfonate, or diazo derivatives (e.g. diazomethane). As condensation agents for promoting the etherification, use can be made of acids, especially acids such as $BF_3$ or $NaBF_4$, or bases such as alcoholates or sodium hydride. Especially good results are obtained with silver bases, such as silver oxide, silver hydroxide, or silver carbonate.

As esterification agents, use can be made of all acids or suitable acid derivatives which form physiologically compatible esters. For example, the following acids or their esterifiable derivatives can be employed: carboxylic acids, such as formic acid, acetic acid, propionic acid, butyric acid, valeric acid, isovaleric acid, trimethylacetic acid, tertiary butylacetic acid, caproic acid, enanthic acid, caprylic acid, palmitic acid, undecanoic acid, benzoic acid, hexahydrobenzoic acid, cyclopenthyl-, cyclohexyl-, or arylacetic acids and -propionic acids, such as phenylacetic or cyclohexylpropionic acid, ether-acids, e.g. p-butoxybenzoic acid or heterocyclic acids, such as furancarboxylic acid-2 or nicotinic acid. Besides the free acids, some of their derivatives, such as their halides, anhydrides, thio-derivatives and ketenes are also suitable for esterification, as are the lower alkyl esters for re-esterification methods. If, in addition to the $1\alpha$-hydroxy groups, other secondary hydroxy groups are also present in the molecule, they also will be reacted during the etherification or esterification.

The process can be used generally for all $1\alpha,2\alpha$-oxido-3-keto-steroids of the androstane series. The oxido-steroids that are used as starting materials can therefore be substituted in various ways, e.g. on the C-atoms 2, 4, 9, 11, 16, or 17. Preferred substituents are e.g. alkyl groups, such as methyl or ethyl groups, alkylidene groups, such as methylene or ethylidene groups, halogen substituents, e.g. fluorine, hydroxyl groups which may be in the form of esterified, etherified, or acetal groups, as well as carbonyl groups. The latter, if they are not 3-keto groups, are reducible under the conditions of this process. Such a reduction may be desired. If it is to be prevented, then the carbonyl groups in question can be protected by functional conversion, e.g. into acetals, enol-ethers, or enamines.

From the group of possible starting materials, the most important ones are those which are represented by the following formula:

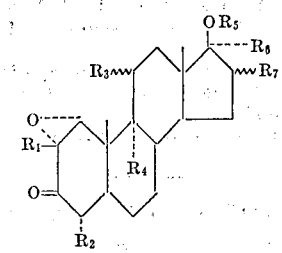

wherein $R_1$ and $R_2$=H or a lower alkyl, preferably a methyl group;

$R_3$=H or OH;

$R_4$=H or F;

$R_5$=H or acyl containing up to 18 carbon atoms;

$R_6$=H or a lower alkyl, alkenyl, or alkynyl group with up to 3 carbon atoms;

$R_7$=H or a lower alkyl or alkylidene group, preferably methyl or methylene.

Under the specified reaction conditions, the $1\alpha,2\alpha$-oxido-$2\beta$-methyl-steroids yield $1\alpha$-hydroxy-$2\alpha$-methyl compounds because after the oxido ring has been opened, the methyl groups migrate into the more stable $\alpha$-position.

Preferred starting materials for the process of this invention are, e.g., $1\alpha,2\alpha$-oxido-androstane-3-one-$17\beta$-ol, as well as its 17-esters, $1\alpha,2\alpha$-oxido-$17\alpha$-methyl-androstane-3-one-$17\beta$-ol; $1\alpha,2\alpha$-oxido-$17\alpha$-ethyl-androstane-3-one-$17\beta$-ol; $1\alpha,2\alpha$-oxido-$17\alpha$-allyl-androstane-3-one-$17\beta$-ol; $1\alpha,2\alpha$-oxido-$17\alpha$-ethynyl-androstane-3-one-$17\beta$-ol; $1\alpha,2\alpha$-oxido-$9\alpha$-fluoro-$11\beta$-hydroxy-$17\alpha$-methyl-androstane-3-one-$17\beta$-ol.

The $1\alpha,2\alpha$-oxido-steroids which are used as starting materials can be obtained from the original unsaturated steroids, namely from the 3-keto-1-androstenes by the usual treatment with a peracid, e.g. perbenzoic acid or monoperphthalic acid, or with alkaline hydrogen peroxide. For additional details, reference is respectfully directed to the method described by P. Striebel et al. in Helv. Chim. Acta, vol. 37, page 1094 (1954).

Some of the starting materials are known, e.g. from J. Org. Chemistry, vol. 27, page 248 (1962) and from German Patent No. 1,096,356.

In general, all starting compounds may be prepared in a known manner from the corresponding 4-androstene-3-keto-steroids which are coverted by the action of $Li/NH_3$ into the corresponding saturated $5\alpha$-androstanes. These are bromated with bromine and subsequently treated with $LiBr/Li_2CO_3$ in dimethyl formamide whereby HBr is split off and the corresponding 1-androstenes are obtained.

4-androstene-3-keto-steroids to be used in the preparation of the starting materials are described, for example, in:

J. Am. Soc., vol. 81, p. 427 (1959); J. Chem. Soc. 1962, p. 1091; Chemische Berichte, 1961, p. 2897; J. Med. Chem., 1963, p. 178; German Patents 1,097,985, 1,117,114, 1,124,489; British specifications 801,024, 801,422, 809,485, 855,300.

The 16-methyl compounds used as starting materials are, for example, available from $16\alpha$- and $16\beta$-methyl-androstenolone as described by P. de Ruggieri et al. in Gaz. chim. ital. (1961), p. 672. Reaction with Li-alkyl (Grignard reaction) yields the corresponding $17\alpha$-alkyl-$17\beta$-OH-compound which is then catalytically hydrogenated in the 5-position and the $3\beta$-OH group is oxidized, preferably with chromic acid, these reactions resulting in the formation of 16-methyl-3-keto-androstanes. Upon dehydrogenation in the 1-position and treatment with a peracid as described above, the starting materials according to Formula II are obtained.

The 17β-hydroxy group of any starting material may be converted into an ester group containing up to 18 carbon atoms according to the methods described hereinabove.

It is to be noted that the preparation of the starting materials will cause no difficulties to one skilled in the art since all processes and reaction steps are well known in the art.

The hydroxy-steroids which are obtained as end products of the process of this invention, and which, if necessary, can be etherified or esterified are characterized by their outstanding pharmacological effectiveness. They exhibit anabolic, androgenic, and antiestrogenic activity.

The new compounds can be used in admixture with the usual pharmaceutical carriers and excipients. Suitable carrier substances are those organic or inorganic materials which are suitable for parenteral, enteral, or topical application and which do not react with these new compounds, as for example water, vegetable oils, polyethylene glycol, gelatin, lactose, starch, magnesium stearate, talc, Vaseline, cholesterol, etc. For parenteral application, solutions are especially suitable, and preferably oily or watery solutions as well as suspensions or emulsions. For enteral application tablets or dragees can also be used, while for topical application use can be made of salves or creams which can, if necessary, be sterilized or mixed with ancillary materials, such as preservatives, stabilizers, wetting agents, salts to influence the osmotic pressure, or buffer substances.

In pharmaceutical preparations, the active substances are generally present in dosages of 0.5 to 300 mg.

The pharmaceutical preparations containing the new compounds of this invention are to be used as drugs in all indications where anabolic, androgenic, and antiestrogenic effects are desired. They may be combined as well with other active compounds with which they are compatible.

The novel compounds of this invention can be administered to mammals. For example, by administering androstane-1α,17β-diol-3-one to a rat, a strong anabolic effect is obtained, and with this particular drug a relatively low androgenic effect is also obtained—which gives the drug a desirable anabolic/androgenic index.

In addition, some of the compounds of this invention, especially androstane-1α,17β-diol-3-one, are valuable intermediates in the production of useful androstanes. For example, androstane-1α,17β-diol-3-one may be converted by standard procedures into the 1α,17β-diacetate or -dipropionate.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

(a) 2 g. 1α,2α-oxido-androstane-17β-ol-3-one are dissolved in 25 cc. absolute tetrahydrofuran and that solution is added, drop-by-drop, to a solution of 0.1 g. lithium in 80 cc. anhydrous liquid ammonia with continual stirring. After 30 minutes, 30 cc. saturated aqueous ammonium chloride solution are slowly added. The resultant mixture is allowed to stand overnight to permit the ammonia to evaporate. It is then dissolved in chloroform, washed in water, in 5% bicarbonate solution, and again in water, and finally dried over sodium sulfate and freed from solvent. The residue is chromatographed on 80 g. silica gel. The androstane-1α,17β-diol-3-one is eluted with chloroform-acetone 4:1, and is purified by recrystallization from acetone. M.P. 253° C.; $[\alpha]_D^{24}$ +20° (chloroform).

(b) 2.1 g. androstane-1α,17β-diol-3-one are allowed to stand overnight at room temperature with 9 cc. absolute pyridine and 9 cc. acetic anhydride. The deposit is stirred into 750 cc. water and the precipitated androstane-1α,17β-diol-3-one-1,17-diacetate filtered with suction, dried, and recrystallized from acetone. M.P. 187° C.; $[\alpha]_D^{24}$ +60° (chloroform).

EXAMPLE 2

(a) 4 g. 1α,2α-oxido-17α-methyl-androstane-17β-ol-3-one are reduced with lithium and ammonia as in Example 1(a). The crude product is chromatographed on 160 g. silica gel. The liberated 17α-methyl-androstane-1α,17β-diol-3-one is removed from the column by chloroform-acetone 4:1 and is purified by recrystallization from acetone. M.P. 216° C.; $[\alpha]_D^{24}$ +11° (chloroform).

The reaction can be performed with calcium instead of lithium.

(b) 1 g. 17α-methyl-androstane-1α,17β-diol-3-one is boiled under reflux 2 hours with 5 cc. chloroform and 5 cc. acetic anhydride. The solvent is filtered off and the crude product chromatographed with silica gel. The 17α-methyl-androstane-1α,17β-diol-3-one-1-acetate is recrystallized from ether. M.P. 110–112° C.

(c) The product of Example 2(a) is converted into the 1-methyl ether of 17α-methyl-androstane-1α,17β-diol-3-one by analogy to the method described in Example 3(b).

EXAMPLE 3

(a) By analogy to Example 1(a), 3 g. 1α,2α-oxido-androstane-17β-ol-3-one-17-propionate are reduced by lithium in liquid ammonia to androstane-1α,17β-diol-3-one-17-propionate and purified by chromatography, the reaction mixture being fractionated after only 5 minutes with ammonium chloride.

(b) 3 g. androstane-1α,17β-diol-3-one-17-propionate are dissolved in 7 cc. dimethyl formamide and reacted with 5.2 g. silver carbonate and 5.4 g. methyl iodide. The solution is stirred 48 hours at room temperature, the silver salts filtered off, and the material worked up with methylene chloride and water. The crude product is purified by chromatography with 120 g. silica gel. The separated 1-methyl-ether of the androstane-1α,17β-diol-3-one-17-propionate is removed from the column with benzene-chloroform 1:4 and recrystallized from ether/petroleum ether. M.P. 137–138° C.; $[\alpha]_D^{22}$ +48° (chloroform).

Similarly androstane - 1α,17β - diol - 3 - one - 17 - acetate (M.P. 230–233° C.) is obtained from 1α,2α-oxido-androstane 17β-ol-3-one-17-acetate and can be converted into the corresponding 1-methyl-ether by analogy to Example 3(b).

(c) By analogy to Example 2(b) the androstane-1α,17β-diol-3-one-17-propionate obtained in Example 3(a) is converted into the androstane-1α,17β-diol-3-one-1-acetate-17-propionate.

EXAMPLE 4

(a) By analogy to Example 3(a), 1.2 g. 1α,2α-oxido-androstane - 17β - ol - 3 - one - 17 - ([β - cyclohexyl]-propionate) (M.P. 154° C.) are reduced by lithium in liquid ammonia to androstane-1α,17β-diol-3-one-17-([β-cyclohexyl]-propionate) which is isolated by chromatography with silica gel and is recrystallized from acetone. M.P. 220–222° C.

(b) By analogy to Example 3(b), the androstane-1α, 17β - diol - 3 - one - 17 - ([β - cyclohexyl]-propionate) obtained in Example 4(a) is converted into the corresponding 1-methyl-ether.

(c) By analogy to Example 2(b), the androstane-1α, 17β - diol - 3 - one - 17 - ([β - cyclohexyl] - propionate) obtained in Example 4(a) is converted into the corresponding 1-acetate.

EXAMPLE 5

3 g. 1α,2α-oxido-androstane-17β-ol-3-one are dissolved in 200 ml. diethylamine. 1.5 g. lithium chips are added to the solution and the mixture is heated to boiling with continual stirring until the lithium has been dissolved. 50 cc. ethanol are then added drop-by-drop. The mixture is poured into water and the resulting and androstane-1α,17β-diol-3-one is extracted with chloroform, purified by chromatography with silica gel, and recrystallized from acetone. M.P. 253° C.

The reaction can also be performed without the addition of alcohol.

EXAMPLE 6

(a) 4 g. 1α,2α-oxido-17α-ethynyl-androstane-17β-ol-3-one are reduced with lithium or sodium in ammonia as in Example 1(a). The crude product is chromatographed with 180 g. silica gel. The 17α-ethynyl-androstane-1α,17β-diol-3-one is recrystallized from acetone.

(b) The compound obtained in Example 6(a) is treated with cyclohexyl bromide in the presence of sodium methylate in a known manner to convert it into the 17α - ethynyl - androstane - 1α,17β - diol - 3 - one - 1-cyclohexyl-ether.

EXAMPLE 7

1.5 g. 1α,2α-oxido-17α-ethyl-androstane-17β-ol-3-one by analogy to Example 1(a) are reduced to 17α-ethyl-androstane-1α,17β-diol-3-one.

Instead of ammonia, a mixture of aniline and tetrahydrofuran can be used in this reaction.

EXAMPLE 8

By analogy to Example 1(a), 1.8 g. of 1α,2α-oxido-9α-fluoro-androstane - 11β,17β - diol-3-one-17-enanthate are converted into 9α - fluoro-androstane-1α,11β,17β-triol-3-one-17-enanthate. The product is worked up in the usual manner and recrystallized from acetone/petroleum ether.

EXAMPLE 9

(a) By analogy to Example 1(a), 5 g. 1α,2α-oxido-androstane-17β-ol-3-one-17-nicotinate are converted into androstane-1α,17β-diol-3-one-17-nicotinate.

(b) By analogy to Example 3(b), the compound obtained in Example 9(a) is converted into the 1-methyl ether of androstane-1α,17β-diol-3-one-17-nicotinate.

(c) By analogy to Example 2(b), the compound obtained in Example 9(a) is converted into the androstane-1α,17β-diol-3-one-1-acetate-17-nicotinate.

EXAMPLE 10

By analogy to Example 1(a), 2.8 g. 1α,2α-oxido-2β,17α-dimethyl-androstane-17β-ol-3-one are reduced to 2α-methyl-androstane-1α,17β-diol-3-one.

EXAMPLE 11

(a) By analogy to Example 1(a), 1.7 g. 1α,2α-oxido-16 - methylene-androstane-17β-ol-3-one-acetate are converted into the 16 - methylene-androstane-1α,17β-diol-3-one-17-acetate.

(b) By analogy to Example 6(b), the compound obtained in Example 11(a) is reacted with butyl bromide to convert it into the 1-butyl ether of the 16-methylene-androstane-1α,17β-diol-3-one-17-acetate.

EXAMPLE 12

(a) By analogy to Example 1(a), 3.1 g. 1α,2α-oxido-9α - fluoro-17α-methyl-androstane-11β,17β-diol-3-one are reduced to 9α - fluoro-17α-methyl-androstane-1α,11β,17β-triol-3-one.

(b) 1.8 g. of the product obtained from Example 12(a) are reacted in the usual manner with undecylenic acid chloride in pyridine. The reaction mixture is allowed to stand overnight, is then poured into water, and the 9α-fluoro-17β-methyl-androstane - 1α,11β,17β-triol-3-one-1-undecylenate is then extracted with chloroform.

If instead of undecylenic acid chloride, the chloride of furane-carboxylic acid is used, the corresponding 1-furanate will be obtained.

EXAMPLE 13

(a) From 2.2 g. 1α,2α-oxido-16β-methyl-androstane-17β-ol-3-one, there will be obtained by the process of Example 1(a), the 16β-methyl-androstane-1α,17β-diol-3-one.

(b) The product obtained in Example 13(a) is reacted with 3,3-dimethyl-butyryl-chloride in pyridine to produce 16β-methyl-androstane-1α,17β-diol-3-one - 1,17 - ditert.-butyl acetate.

EXAMPLE 14

(a) 1.8 g. of 1α,2α-oxido-16α-methyl-androstane-17β-ol-3-one-parabutoxy-benzoate are reduced by the method of Example 1(a) to 16α-methyl-androstane-1α,17β-diol-3-one-17-parabutoxy-benzoate.

(b) By analogy to the method of Example 6(b), the compound obtained in Example 14(a) is converted into the corresponding 1-tert.-butyl ether.

Examples for pharmaceutical preparations:

(A) Injection solution 2 g. of androstane-1α,17β-diol-3-one-17-cyclohexyl-propionate are dissolved in 1000 cc. of peanut oil. Ampoules are filled with 1 ml. of this solution each and are sterilized in the usual manner.

(B) Injection solution

Each ampoule contains:

10 mg. of androstane-1α,17β-diol -3-one-17-cyclo-hexyl-propionate dissolved in 1 cc. of peanut oil. The ampoules are preferably filled under nitrogen.

(C) Tablets

One tablet contains:

| | Mg. |
|---|---|
| 17α-methyl-androstane-1α,17β-diol-3-one | 5 |
| Corn starch | 15 |
| Lactose | 120 |
| Talc | 10 |

(D) Injection solution 5 g. of androstane-1α,17β-diol-3-one-1,17-diacetate are dissolved in 150 ml. of peanut oil. The solution is filled into ampoules according to standard procedures in a manner that each ampoule contains 50 mg. of the active ingredient.

(E) Tablets

Each tablet contains:

| | Mg. |
|---|---|
| 17α-methyl-androstane-1α,17β-diol-3-one-1-acetate | 5 |
| Lactose | 80 |
| Potato starch | 10 |
| Magnesium stearate | 2 |

(F) Injection solution

Each ampoule contains:

50 mg. of androstane-1α,17β-diol-3-one-17-propionate in 1 cc. of peanut oil. The ampoules are sterilized according to standard procedures.

(G) Tablets

One tablet contains:

| | Mg. |
|---|---|
| Androstane-1α,17β-diol-3-one | 2 |
| Lactose | 75 |
| Corn starch | 16 |
| Talc | 6 |
| Magnesium stearate | 1 |

The determination of the anabolic and androgenic effectiveness was made through the musculus levator ani and the spermatic gland weight test according to the method disclosed by Hershberger, Shipley, and Meyer in "Proceedings of the Society for Experimental Biology and Medicine," vol. 83, pp. 175–180 (1953). The rats were treated with the new compounds by oral and by subcutaneous administration.

Androstane-1α,17β-diol-3-one, 17α-methylandrostane-1α,17β-diol-3-one and androstane - 1α,17β-diol-3-one-17-cyclohexylpropionate show a good index of anabolic:androgenic activity whereas the index of androgenic:anabolic activity is remarkable for androstane-1α,17β-diol-3-one - 17 - propionate and the corresponding - 1,17-diacetate. The introduction of the 1α-OH group into androstane 17β-ol-3-one - 17-acetate yielding androstane-1α,17β - diol - 3 - one - 17 - acetate approximately doubles the anabolic activity whereas the introduction of said substituent into androstane-17β-ol-3-one yielding androstane - 1α,17β-diol-3-one surprisingly increases this activity about ten-fold.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. A compound of the formula

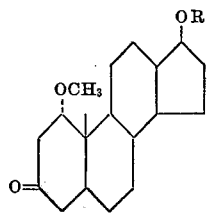

wherein R is a member of the group consisting of acetyl, propionyl, cyclohexylpropionyl, and nicotinyl.

2. 1-methyl-ether of 17α - methyl-androstane-1α,17β-diol-3-one.

3. A process for the reductive splitting of an oxido ring in 3-keto steroids without reducing the 3-keto group, which process comprises reacting at —100° C. to +100° C. a 1α,2α-oxido-3-keto-steroid of the androstane series with a metal selected from the group consisting of an alkali metal and an alkaline earth metal, in a liquid medium selected from the group consisting of liquid ammonia, a primary amine, and a secondary amine with up to 10 carbon atoms and less than 3 amino groups, the molar ratio of metal to the 1α,2α-oxido-3-keto-steroid being about from 1:1 to 1:15 to form the corresponding 1α-hydroxy-3-keto-steroids.

4. The process of claim 3 wherein the reaction is carried out in the presence of an aliphatic alcohol containing from 1 to 5 carbon atoms.

5. The process of claim 3 wherein the reaction is carried out in the presence of an inert solvent selected from the group consisting of ether, tetrahydrofuran, dioxane, benzene, toluene, and petroleum ether.

6. The process of claim 3 wherein the reaction is carried out in the presence of an aliphatic alcohol containing from 1 to 5 carbon atoms and an inert solvent selected from the group consisting of ether, tetrahydrofuran, dioxane, benzene, toluene, and petroleum ether.

References Cited

UNITED STATES PATENTS

| | | | |
|---|---|---|---|
| 3,118,916 | 1/1964 | Goedicke | 260—397.4 |
| 3,131,125 | 4/1964 | Wettstein et al. | 167—65 |

H. A. FRENCH, *Primary Examiner.*